(12) United States Patent
Shivashankar et al.

(10) Patent No.: US 9,455,874 B2
(45) Date of Patent: Sep. 27, 2016

(54) METHOD AND APPARATUS FOR DETECTING COMMUNITIES IN A NETWORK

(71) Applicant: Telefonaktiebolaget L M Ericsson (publ), Stockholm (SE)

(72) Inventors: Subramanian Shivashankar, Chennai (IN); Balaraman Ravindran, Chennai (IN); Vishnu Sankar, Chennai (IN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 290 days.

(21) Appl. No.: 14/143,283

(22) Filed: Dec. 30, 2013

(65) Prior Publication Data

US 2015/0188783 A1   Jul. 2, 2015

(51) Int. Cl.
  *G06F 15/16*   (2006.01)
  *H04L 12/24*   (2006.01)
  *G06Q 30/02*   (2012.01)

(52) U.S. Cl.
  CPC .......... *H04L 41/12* (2013.01); *G06Q 30/0241* (2013.01); *H04L 41/14* (2013.01)

(58) Field of Classification Search
  CPC ... G06Q 50/01; H04L 51/32; H04L 41/0853; H04L 41/0893; H04L 43/0811
  See application file for complete search history.

(56) References Cited

U.S. PATENT DOCUMENTS

| 8,385,906 B2 | 2/2013 | Kumar et al. | |
| 2008/0162259 A1* | 7/2008 | Patil | G06Q 30/02 705/7.29 |
| 2008/0313251 A1 | 12/2008 | Ma et al. | |
| 2013/0198191 A1 | 8/2013 | Hernandez et al. | |
| 2013/0268595 A1* | 10/2013 | Mohan | H04L 51/32 709/204 |

OTHER PUBLICATIONS

Leskovec et al, Defining and Evaluating network communities based on fround-truth, Oct. 4, 2013, Springer-Verlag London 2013, 180-213.*
V. Blondel et al.: "Fast unfolding of communities in large networks" arXiv:0803.0476v2 [physics.soc-ph] Jul. 25, 2008; 12 pages.
S. Fortunato et al.: "Resolution limit in community detection", PNAS vol. 104, No. 1; Jan. 2, 2007; pp. 36-41.
J. Yang et al.: "Defining and Evaluating Network Communities based on Ground-truth", arXiv:1205.6233v3 [cs.SI] Nov. 6, 2012; 10 pages.

* cited by examiner

*Primary Examiner* — Djenane Bayard
(74) *Attorney, Agent, or Firm* — Patent Portfolio Builders, PLLC

(57) ABSTRACT

A method for detecting communities in a network comprises the steps of defining an internal scoring function (IS) for a community, wherein the internal scoring function quantifies an internal quality of the community, and defining an external scoring function (ES) for a community, wherein the external scoring function quantifies an external quality of the community. A community scoring function (IE) for a community is determined, wherein the community scoring function comprises a product of the internal scoring function and the external scoring function. A network scoring function is determined, wherein the network scoring function is based on the community scoring functions of communities in the network. The network scoring function is used by a maximization algorithm, for example a greedy maximization algorithm, for detecting a community in a network.

20 Claims, 11 Drawing Sheets

METHOD AND APPARATUS FOR DETECTING COMMUNITIES IN A NETWORK

TECHNICAL FIELD

The present invention relates to a method and apparatus for detecting communities in a network, and in particular to a method and apparatus for detecting small communities in large networks.

BACKGROUND

Networks are the simplest form of representation of the interactions between real world objects. Most of these real world networks exhibit the property of community structure, i.e. nodes in the network can be partitioned into groups such that more edges are present between nodes belonging to the same group than between the nodes belonging to different groups.

This structural property is important as the groups in the networks correspond to a real world property of the network. For example, groups can exist based on interests, ethnicity, location and social behavior in a telecommunications call graph network, users grouped based on favorite shopping/hangout destinations using a mobility graph, and so on.

The structural properties of groups or communities can be used for a variety of applications, such as recommending services, pushing advertisements to certain users, customizing schemes, finding alpha users within a community to increase up-selling, finding an influence circle of a user, which can be used for recommender systems, and so on. It is also relevant to other domains, for example, identifying research area in a collaboration network, or grouping related pages in World Wide Web.

Community detection algorithms have been developed to detect the presence of communities or groups in a network. Different types of algorithms exist, including ones that perform a divisive, agglomerative or maximization of an objective function.

Many different scoring functions exist for use by community detecting algorithms. Modularity is a term used for one such popular scoring function (an objective function) which quantifies the quality of communities. Finding communities by maximization of modularity is a widely used method. One such example is a so-called Louvain method which greedily maximizes modularity, and is currently one of the fastest algorithms to find communities within a network. Further details of this method are discussed in a paper entitled "Fast unfolding of communities in large networks", by Vincent D. Blondel, et al, Journal of Statistical Mechanics, 2008, arXiv:0803.0476.

A disadvantage of modularity is that it suffers from resolution limit. A paper entitled "Resolution limit in a community detection" by Santo Fortunato, et al, Proceedings of the National Academy of Sciences of the United States of America (PNAS), vol. 104, no. 01, January 2007, discusses how modularity optimization can fail to identify modules smaller than a scale which depends on the total size of the network and on the degree of interconnectedness of the modules, even in cases where modules are unambiguously defined. In other words, modularity cannot find small communities in a large network. For instance in a mobility graph, if there are two close groups (with high interactions), if a user A belongs to group 1 and user B belongs to group 2, even if user A and B have less common interests but are connected, then a modularity based method would combine these two communities into one community.

Furthermore, other techniques such as the divisive technique or agglomerative technique are not scalable, as discussed in US2008/0313251A1 and US2013/0198191A1.

SUMMARY

It is an aim of the present invention to provide a method and apparatus which obviate or reduce at least one or more of the disadvantages mentioned above.

According to a first aspect of the present invention there is provided a method for detecting communities in a network. The method comprises the steps of defining an internal scoring function (IS) for a community, wherein the internal scoring function quantifies an internal quality of the community. An external scoring function (ES) is defined for a community, wherein the external scoring function quantifies an external quality of the community. A community scoring function (IE) is determined for a community, wherein the community scoring function comprises a product of the internal scoring function and the external scoring function. A network scoring function is determined, wherein the network scoring function is based on the community scoring functions of communities in the network. The network scoring function is used in a maximization algorithm for detecting a community in the network.

According to another aspect of the present invention, there is provided a method for detecting communities in a network, the method comprising the steps of performing a maximization algorithm using a scoring function as defined by the method above.

According to another aspect of the present invention there is provided a system for detecting communities in a network. The system comprises an internal score unit for defining an internal scoring function (IS) for a community, wherein the internal scoring function quantifies an internal quality of the community, and an external score unit for defining an external scoring function (ES) for a community, wherein the external scoring function quantifies an external quality of the community. The system comprises a community score unit for determining a community scoring function (IE) for a community, wherein the community scoring function comprises a product of the internal scoring function and the external scoring function, and a network score unit for determining a network scoring function, wherein the network scoring function is based on the community scoring functions of communities in the network, wherein the network scoring function is for use by a maximization algorithm for detecting a community in a network.

According to another aspect of the present invention, there is provided a computer program product encoded in at least one non-transitory computer usable medium for use with a computer device. The computer program product comprises: an internal score functional module for defining an internal scoring function (IS) for a community, wherein the internal scoring function quantifies an internal quality of the community; an external score functional module for defining an external scoring function (ES) for a community, wherein the external scoring function quantifies an external quality of the community; a community score functional module for determining a community scoring function (IE) for a community, wherein the community scoring function comprises a product of the internal scoring function and the external scoring function; a network score functional module for determining a network scoring function, wherein the network scoring function is based on the community scoring functions of communities in the network; wherein the network scoring function is for use by a maximization algorithm for detecting a community in a network.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

The embodiments of the present invention are concerned with a new scoring function which assigns a score for the communities identified in a network. The new scoring function according to embodiments of the invention may be used by other algorithms to find communities in a network, for example an algorithm which performs a greedy maximization using this scoring function. It is noted, however, that the scoring function according to embodiments of the invention may be used with other algorithms for detecting communities in a network.

Figure 1:
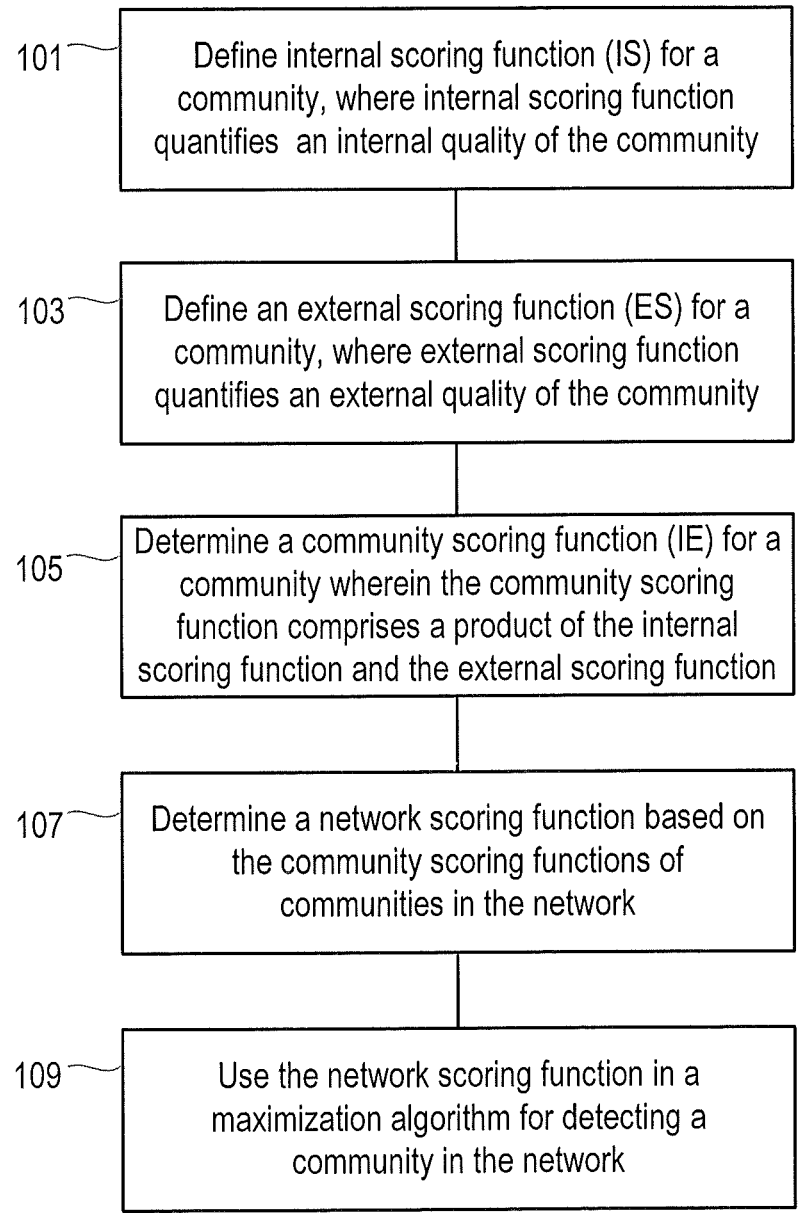
FIG. 1 shows a method according to an embodiment of the present invention.

FIG. 1 shows a method according to an embodiment of the invention for detecting communities in a network. The method comprises the step of defining an internal scoring function (IS) for a community, wherein the internal scoring function quantifies an internal quality of the community, step 101. An external scoring function (ES) is defined for a community, wherein the external scoring function quantifies an external quality of the community, step 103. A community scoring function (IE) is determined for a community, wherein the community scoring function comprises a product of the internal scoring function and the external scoring function, step 105. A network scoring function is determined, step 107, based on the community scoring functions of communities in the network. The network scoring function is then used by a maximization algorithm for detecting a community in the network, step 109.

From the above it can be seen that the scoring function according to an embodiment of the invention is defined as the product of an internal score and an external score of a community.

The internal scoring function (IS) for a community is a function relating to how well connected all members of the community are with each other. The external scoring function (ES) for a community is a function relating to how well separated the community is from the remainder of the network. These may be determined, for example, by first putting nodes in a graph into several communities such that each node belongs to one community. Then by counting the number of intra community edges, inter community edges and the number of nodes in a community and applying the respective formula described below, the internal and external scores are calculated.

As mentioned above, the internal quality of a community is based on a requirement that all the members of the community should be well connected with each other. This can quantitatively be expressed as the internal density of the community which ranges from 0 to 1, with 1 representing the highest internal score. The external quality of the community is a measure of how well the community is separated from rest of the network. This can quantitatively be expressed as the separability of the community. However, separability does not range from 0 to 1. Thus, according to one embodiment the external score may be expressed as a normalized form of separability which ranges from 0 to 1, with 1 representing the highest external score.

According to one embodiment, both the internal scoring function and the external scoring function range between 0 and 1. As such, it will be appreciated that the community scoring function will be high only if both the internal scoring function and the external scoring function of the community are high.

According to one embodiment the internal scoring function (IS) for a community is defined as:

$$\text{Internal Scoring Function} = \frac{a_s}{\binom{n_s}{2}},$$

where s relates to a community, $a_s$ relates to the number of intra community edges in a community s, and where $n_s$ relates to the number of nodes in a community s.

According to one embodiment the external scoring function (ES) for a community is defined as:

$$\text{External Scoring function} = \frac{a_s}{a_s + b_s},$$

where s relates to a community, $a_s$ relates to the number of intra community edges in a community s, and where $b_s$ relates to the number of inter community edges in a community s.

It is noted that an inter community edge relates to an edge which connects a node of one community to another node in another community, whereas an intra community edge relates to an edge which connects a node in one community to another node in the same community.

According to one embodiment, the community scoring function (IE) for a community is defined as:

$$\text{Community Score} = \frac{a_s}{\binom{n_s}{2}} \frac{a_s}{a_s + b_s},$$

where s relates to a community, $a_s$ relates to the number of intra community edges in a community s, where $b_s$ relates to the number of inter community edges in a community s, and where $n_s$ relates to the number of nodes in a community s.

The community scoring function (IE) therefore gives a score to one community. A network has many communities, and a network scoring function is therefore used to determine a network score for the network.

The network scoring function may comprise a weighted sum of scores of all the communities in the network. Furthermore, the weight corresponding to each community may comprise the number of nodes in that community, normalized by dividing the number of nodes in that community by the total number of nodes in the network.

Thus, the step of determining a network scoring function (NS) for a community, according to one embodiment, is defined as:

$$\text{Network Scoring function} = \sum_{s \in S} \frac{n_s}{n} \frac{a_s}{\binom{n_s}{2}} \frac{a_s}{a_s + b_s},$$

where s relates to a community, $a_s$ relates to the number of intra community edges in a community s, where $b_s$ relates to the number of inter community edges in a community s, and where $n_s$ relates to the number of nodes in a community.

The score ranges from 0 to 1 in a simple, unweighted network. The score of a community takes the value of 0 when it has no intra community edge. The score of a community takes the value of 1 when it is a clique, as well as the community having no inter community edge.

Thus, a community achieves a high score only when the community achieves a high score in internal density as well as separability. If a community does not achieve a good score in either one of these, then the community will achieve a low score.

In a weighted network, the measure takes the low value of 0 but the high value is dependent on weights of edges of the network. In other words, $a_s$ and $b_s$ will be the sum of weights of edges, with no normalization being carried out. The community score across networks in weighted networks are not comparable but the score obtained by two communities belonging to the same network is comparable. This means that a maximization of a scoring function according to embodiments of the present invention, for example using a Louvain algorithm to find communities, e.g. a greedy maximization of the scoring function to find communities, will work in weighted networks also. In other words, although there are few networks where an edge has weights, the embodiments of the present invention have the advantage of working in such weighted networks also. In an unweighted network, no edge will have weight, i.e., all the edges in an unweighted network are assumed to have a weight of 1. In a weighted network, the weight of an edge could be any number.

Further details will now be provided regarding how the scoring function according to embodiments of the present invention may be used in a maximization algorithm, for example a greedy maximization procedure using the scoring function of the embodiments of the invention. A greedy approach to finding communities by maximizing an objective function is already proposed by Louvain, as noted above. This method is one of the fastest known heuristic, the same method can be used to maximize the scoring functions according to embodiments of the invention. The algorithm has two phases.

Figure 2A:
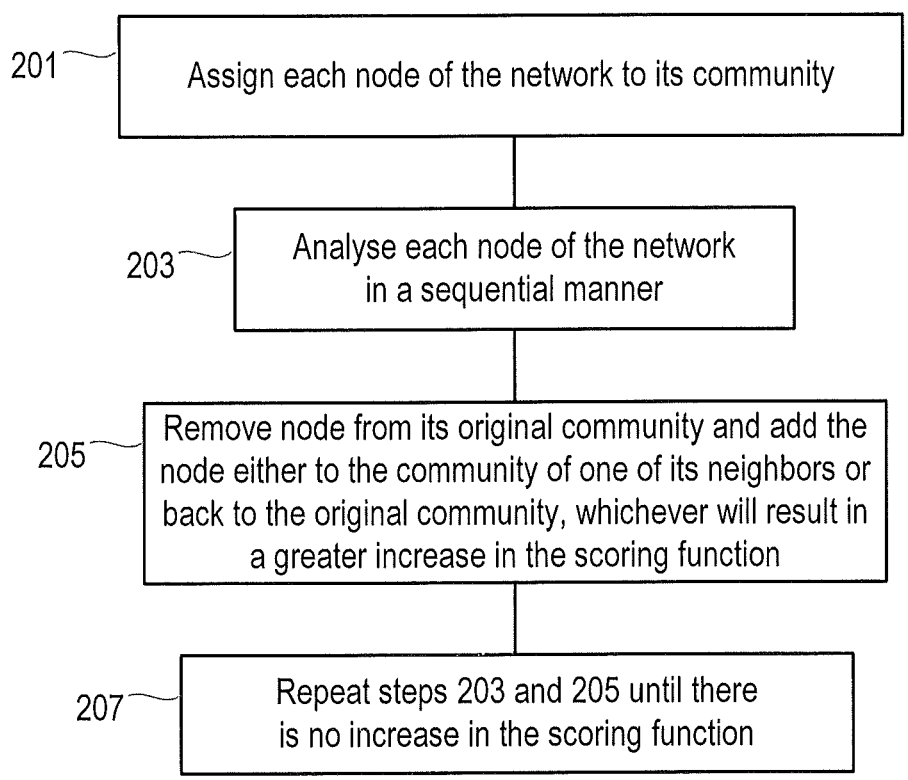
FIG. 2a shows a method according to another aspect of the present invention.

FIG. 2a shows the steps performed by a first phase of such an algorithm. In step 201, each node of the network is assigned to its own community. Then, each node in the network is analysed in a sequential manner, step 203. This comprises the steps of removing the node from its original community and adding the node either to the community of one of its neighbors or back to the original community, depending upon whichever will result in a greater increase in the scoring function, step 205.

The method comprises the step of repeating this process iteratively (i.e. repeating steps 203 and 205) until there is no increase in the scoring function. At this time, the scoring function will reach its local maxima and the first phase ends.

It is noted that step 201 in an initialization step, which is typically carried out once every time the first phase is executed. Steps 203 and 205 are repeated until there is no increase in the scoring function.

The network score of a network is the sum of scores of all the communities in the network. The community score of all the communities in the network is calculated after step 201. The sum of all such scores provides the network score. The properties of a community, such as the number of nodes in a community, number of intra community edges and number of inter community edges are kept associated with the community. Whenever a node is added or removed to a community, the properties of a community are modified accordingly, and only the increase or decrease which happens to that particular community is calculated. The network score also changes by the same increase or decrease that happened to the modified community (i.e. because it is the sum of scores of all communities). Since the network score is already known before addition or deletion of node from any community, the new network score can be calculated by a single addition or subtraction after every change (addition or deletion of a node in a community).

It is noted that neighbor communities of a node are the set of all of communities of neighbors of the node in the network. In most of the cases, there will be more than one neighbor. The method calculates the increase in the network score when a node is attached to every one of its neighbor communities. The method selects the neighbor community which gives the highest increase. It adds the node to that neighbor community. Sometimes adding the node back to its original community will give a greater increase to the network score than adding the node to any of the neighbor communities. In that case, the node will be added back to the original community.

Figure 2B:
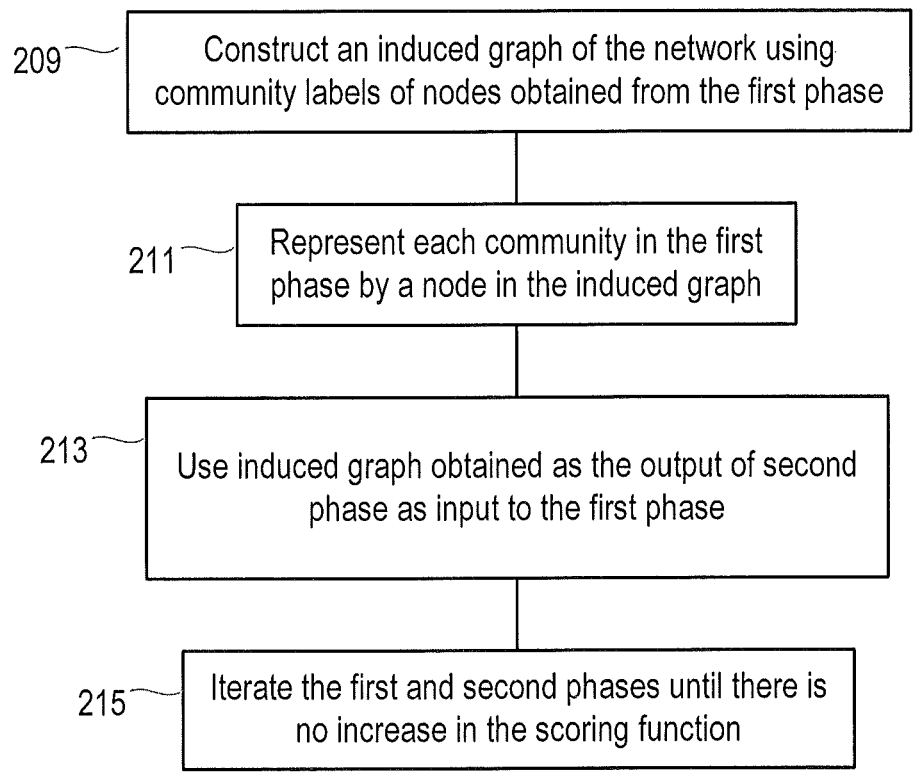
FIG. 2b shows a method according to another aspect of the present invention.

FIG. 2b shows the steps performed during a second phase of the algorithm. A first step of the second phase comprises the step of constructing an induced graph of the network using community labels of nodes obtained from the first phase, step 209. A community label is the community to which a node belongs. The method assigns every node in the graph to be its own community in step 201 of the first phase shown in FIG. 2a. Step 205 of the first phase removes every node from its community. At this time, the node will not have any community. Step 205 adds the node to the neighbour community or back to the original community from which it was removed. The node will get the neighbour community label or the label of its original community.

Each community in the first phase is represented by a node in the induced graph, step 211.

The community properties, for example the number of nodes in the community, sum of degree of all nodes in the community and the number of intra community edges are all preserved in the induced graph by associating them with the respective node. The weight of an edge between two nodes in the induced graph is equal to the sum of weights of all edges between those two communities in the original graph.

The induced graph obtained as the output of second phase is used or given as input to the first phase, step 213.

The method comprises the step of iterating the first and second phases until there is no increase in the scoring function, step 215. At this time, the scoring function will reach a maximum value.

FIGS. 3 to 6 provide comparisons of results of experiments that have been performed, comparing the scoring function of embodiments of the present invention with other popular scoring functions.

The tests have compared the widely used scoring functions known as 1) conductance, 2) triangle participation ratio (TPR) and 3) modularity, against the community scoring function (IE) of embodiments of the present invention. The comparison was made using perturbation techniques, as described in a paper entitled "Defining and Evaluating Network Communities based on Ground-truth", by Jaewon Yang et al, Proceedings of 2012 IEEE International Conference on Data Mining (ICDM), arXiv:1205.6233. The ground-truth communities for the live journal network were obtained from the Stanford Network Analysis Platform (SNAP).

The ground-truth community is disturbed by using the perturbation techniques. It is noted that a good scoring function should not only give a high score to the ground-truth communities, but should also give a low score to the perturbed communities. A z-score was used to quantify the difference of score between ground-truth communities and perturbed communities.

A z-score is defined as follows. Let S be the set of all communities and s be one such community. Let score(s) denote the community score of community s. The test disturbs the community by any one of the perturbation techniques. The community score of the disturbed community is calculated. Let disturbed_score(s) denote this score. Then the z-score is give by:

$$z\text{-score} = \frac{Es[\text{score}(s) - \text{disturbed\_score}(s)]}{SDs[\text{distrubed\_score}(s)]}.$$

Here, Es refers to the expectation over all communities and SDs refers to the standard deviation over all communities. A more detailed description of the z-score can be found in a paper entitled "Defining and Evaluating Network Communities based on Ground-truth", by Jaewon Yang et al, Proceedings of 2012 IEEE International Conference on Data Mining (ICDM), arXiv:1205.6233.

Figure 3:
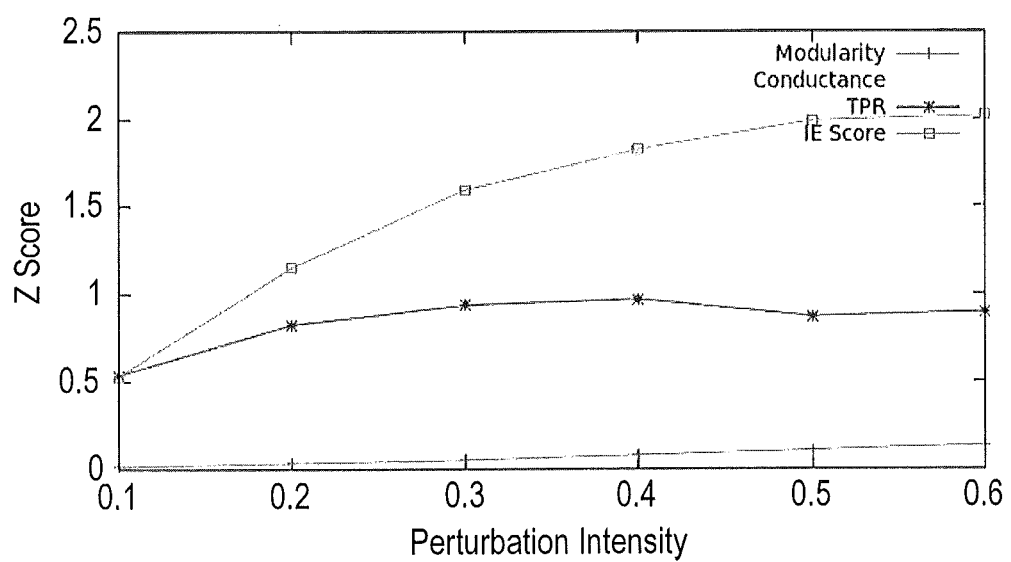
FIG. 3 compares results between an embodiment of the invention and other scoring techniques, based on a node swap perturbation technique.

FIG. 3 shows the comparative results for a perturbation technique known as the "node swap" technique. The node swap perturbation technique is a technique in which nodes at the boundary of the ground-truth community is swapped with one of its neighbors belonging to a different community. It disturbs the nodes at the fringe of a community but the number of nodes remains the same before and after the perturbation. The result of the node swap perturbation is shown in FIG. 3. It can be seen that the community scoring function according to embodiments of the invention performs better than the modularity, conductance and TPR techniques.

Figure 4:
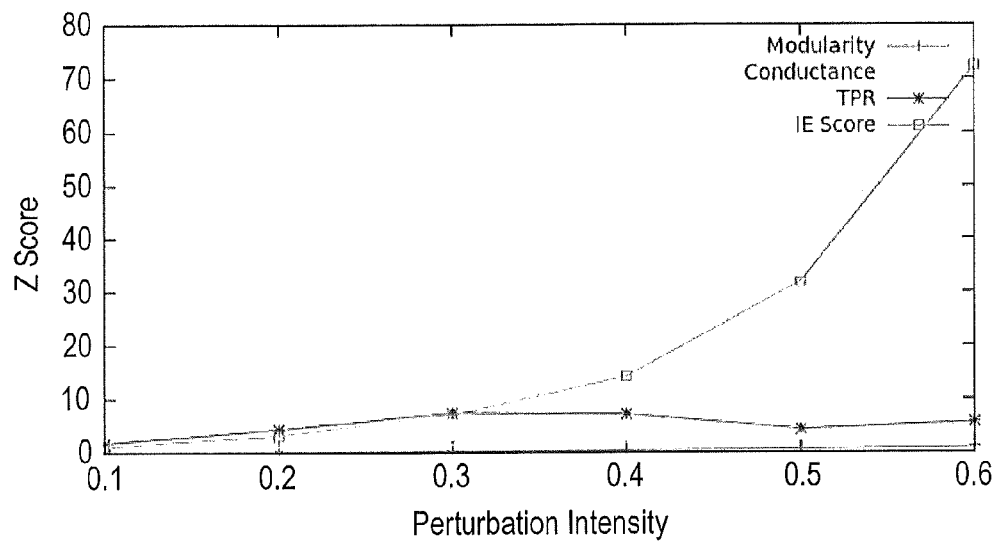
FIG. 4 compares results between an embodiment of the invention and other scoring techniques, based on a random perturbation technique.

FIG. 4 shows the comparative results for a perturbation technique known as the "random" technique. The random technique is a perturbation technique in which nodes of the ground-truth community are swapped with any other node in the network which belongs to a different community. It disturbs the community more than the node swap perturbation. The result of the random perturbation is shown in FIG. 4, where it can be seen that the community scoring function according to embodiments of the invention performs better than the modularity, conductance and TPR techniques, particularly at greater perturbation intensities.

Figure 5:
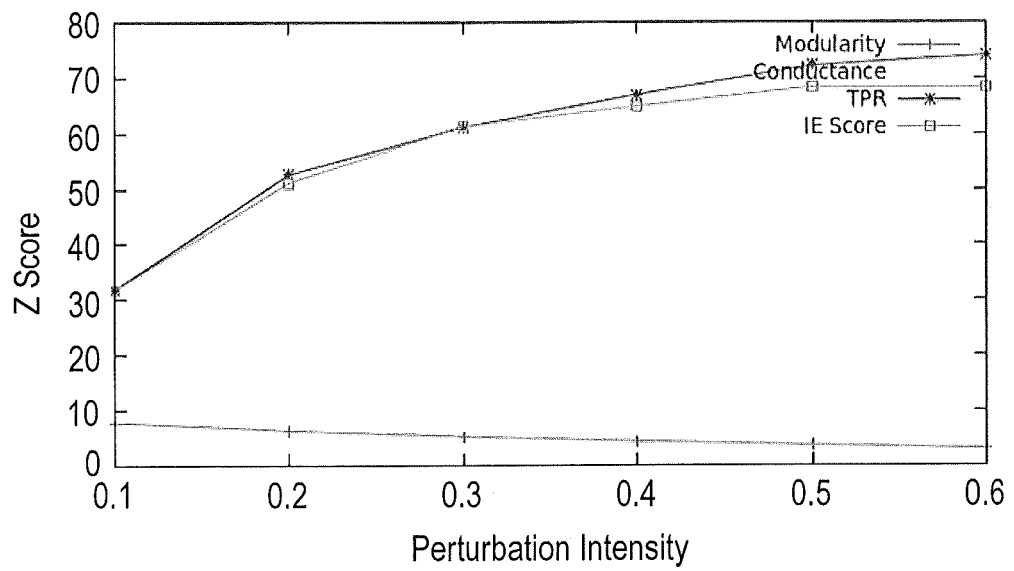
FIG. 5 compares results between an embodiment of the invention and other scoring techniques, based on an expand perturbation technique.

FIG. 5 shows the comparative results for a perturbation technique known as the "expand" technique. The expand technique is a perturbation technique in which nodes at the boundary of the ground-truth community which belong to a different community are included in the community. It disturbs the community by increasing the fringe resulting in an increase in the number of nodes. The result of the expand perturbation is shown in FIG. 5, where it can be seen that the community scoring function according to embodiments of the invention performs better than the modularity and conductance techniques, although not quite as good as the TPR technique.

Figure 6:
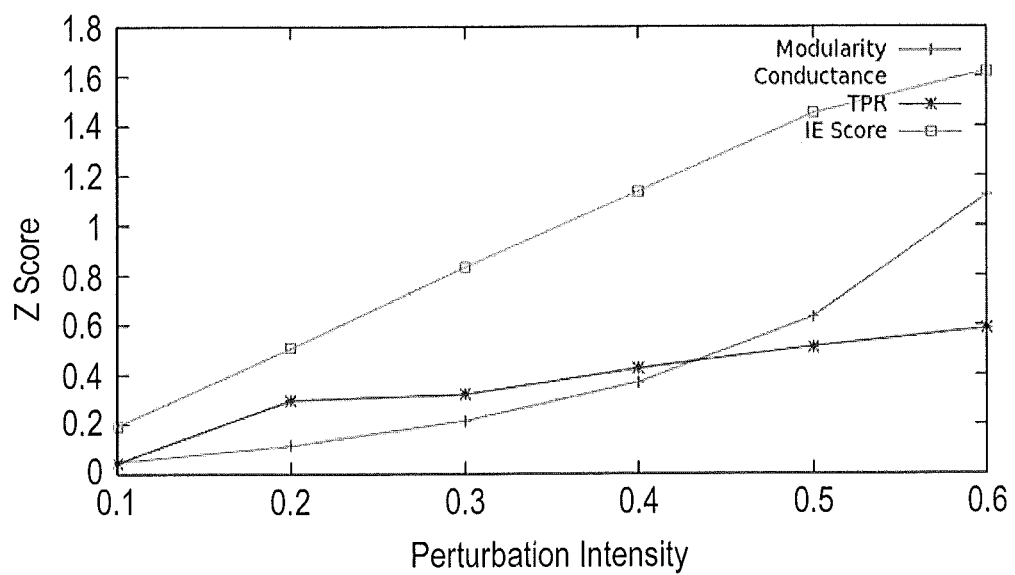
FIG. 6 compares results between an embodiment of the invention and other scoring techniques, based on a shrink perturbation technique.

FIG. 6 shows the comparative results for a perturbation technique known as the "shrink" technique. The shrink technique is a perturbation technique in which nodes at the boundary of the ground-truth community are removed from the community. It disturbs the community by decreasing the fringe resulting in a decrease in the number of nodes. The result of the shrink perturbation is shown in FIG. 6, where it can be seen that the community scoring function according to embodiments of the invention performs better than the modularity, conductance and TPR techniques, particularly at greater perturbation intensities.

Thus, from FIGS. 3 to 6 it can be seen that for all four of the perturbation techniques, the community scoring function IE according to embodiments of the present invention performs better than the others, except for the Expand perturbation technique, where triangle participation ratio (TPR) is better. The poor performance of the existing scoring functions is due to the reason that they do not capture all the necessary parameters to quantify a community.

It is noted that the greedy maximization of the scoring function to find communities according to embodiments of the present invention have also been run on synthetic graphs, where the communities are intuitive in nature. These have been compared with the widely used modularity maximization technique.

Figure 7A:
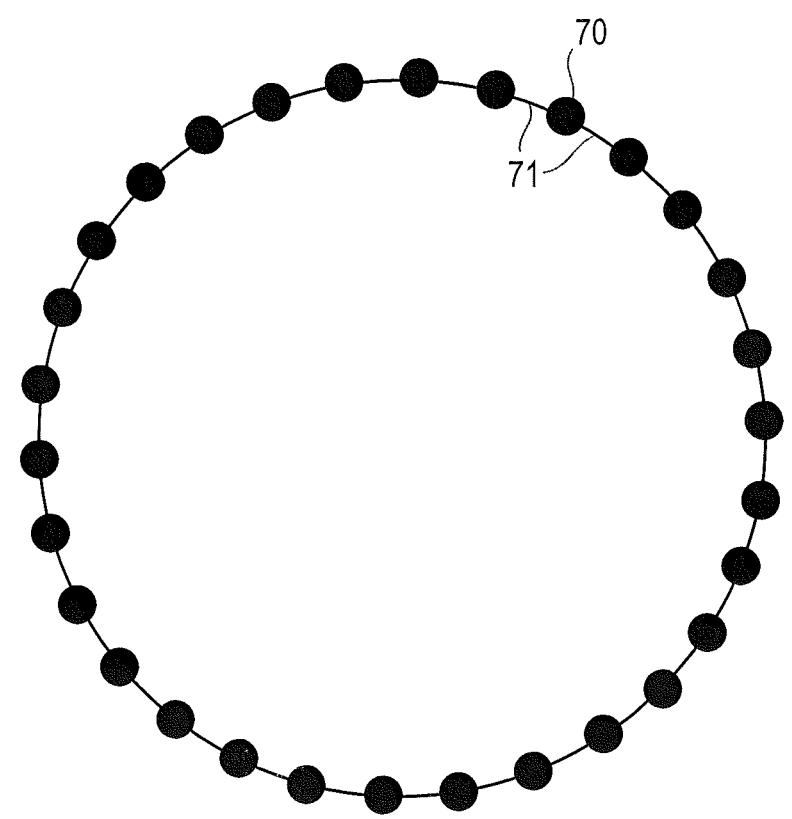
FIGS. 7a to 7e show examples of a network.

Referring to FIG. 7*a*, several equal sized cliques 70 are shown arranged in a circle. Each clique 70 is then connected to the neighbors on either side by a single edge 71. The intuitive number of communities in this network is the number of cliques 70, and each community is the clique.

The example of FIG. 7*a* shows a network of 30 cliques, with each clique having 5 nodes and 10 edges. When detecting communities in such a network using greedy maximization of a scoring function according to embodiments of the present invention, it is noted that 30 cliques were detected, with each clique being a single community.

However, with such a network as that of the example of FIG. 7*a*, a modularity maximization technique detected only 15 cliques, with every two adjacent cliques belonging to a single community. Failure of the modularity maximization method in this network is due to the resolution limit. It is noted that numerous such examples can be constructed where algorithms according to embodiments of the invention perform better than the modularity maximization technique.

Figure 7B:
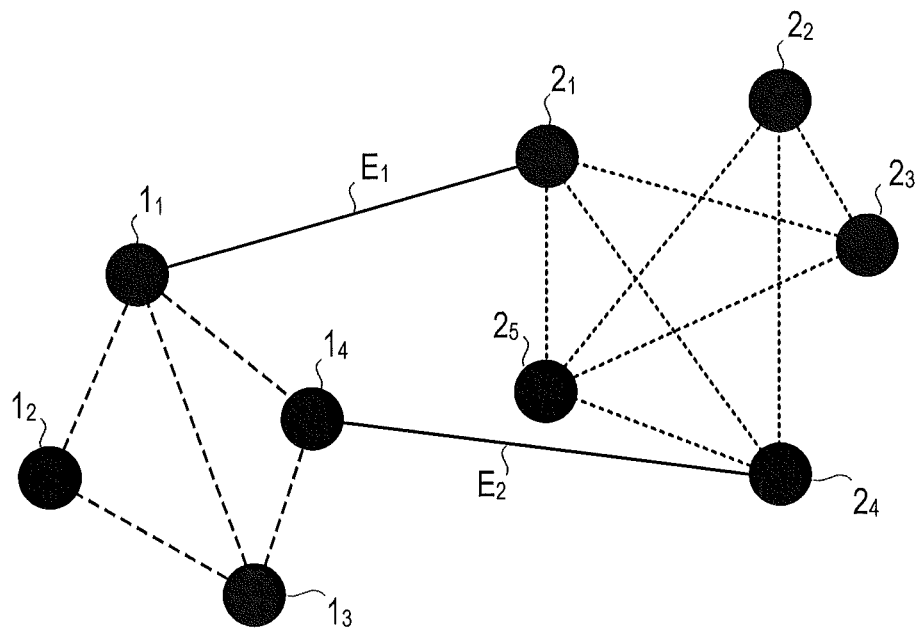

FIG. 7*b* shows a graphical representation of a further example of a network comprising a first community (Community 1 comprising four nodes $1_1$ to $1_4$) and a second community (Community 2 comprising five nodes $2_1$ to $2_5$). The various lines represent edges in the graph, the dashed lines belonging to Community 1, the dotted lines belonging to Community 2, and the solid lines connecting Community 1 and Community 2.

In particular, the dashed lines represent edges that are intra community edges of Community 1, the dotted lines represent edges that are intra community edges of Community 2, while the solid lines represent edges that are inter community edges between Community 1 and Community 2.

Thus, the community properties of the network shown in FIG. 7b are as follows:

Number of nodes (n)=9
Number of communities (m)=2
Community 1
Number of intra community edges ($a_1$)=5
Number of inter community edges ($b_1$)=2
Number of nodes in the community ($n_1$)=4
Community 2
Number of intra community edges ($a_2$)=8
Number of inter community edges ($b_2$)=2
Number of nodes in the community ($n_2$)=5

From the equations shown earlier, the community score is defined as a product of the internal score and external score, as follows:

$$\text{Community score} = \left(\frac{a_s}{a_s + b_s}\right)\left(\frac{a_s}{\binom{n_s}{2}}\right),$$

where $$\binom{n_s}{2}$$

represents combination.

Here, the term $$\frac{a_s}{a_s + b_s}$$

represents the external score and the term $$\frac{a_s}{\binom{n_s}{2}}$$

represents the internal score.

Thus, $$\text{the score of Community 1} = \left(\frac{5}{7}\right)\left(\frac{5}{6}\right) = \frac{25}{42} = 0.5952$$

$$\text{the score of Community 2} = \left(\frac{8}{10}\right)\left(\frac{8}{10}\right) = \frac{64}{100} = 0.64$$

The network scoring function is defined as:

$$\text{Network Scoring function} = \sum_{s=1}^{m} \frac{n_s}{n} * \text{Community Score}$$

$$\text{Network score} = \frac{4 * 0.5952}{9} + \frac{5 * 0.64}{9} = 0.2645 + 0.36 = 0.6245$$

This network score can then be used by a maximization algorithm, such as a greedy maximization algorithm, to detect communities in a network.

A resolution limit is defined as the failure of a method to identify communities smaller than a scale which depends on the total size of the graph. This limitation generally does not occur in small sized graphs.

Figure 7C:
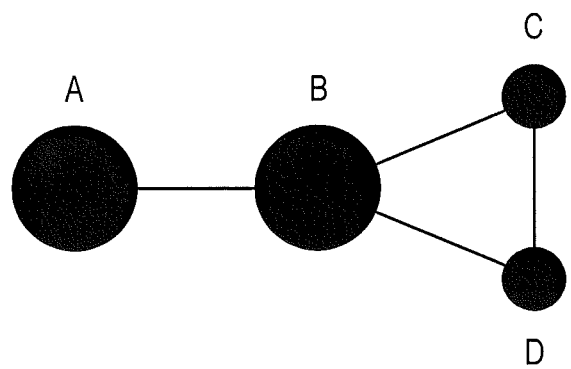

FIG. 7c shows a network comprising four communities, A, B, C and D. Networks A and B are cliques of size 20, i.e. 20 nodes and 190 edges. The solid lines represent a single edge.

Maximization of a scoring function according to embodiments of the present invention gives four communities as expected, those being A, B, C and D. However, maximization of Modularity (being the widely used method at present) gives only three communities, those being A, B and a third community which includes both C and D.

From the above it can be noted that the modularity maximization method is not able to find communities which are smaller in size when compared to the size of the network.

Maximization of a scoring function according to the embodiments of the invention does not have any limitations such as the resolution limit. Since both the maximization of modularity and the maximization of a scoring function according to embodiments of the invention are based on the Louvain method, both are scalable. The embodiments of the present invention differ from modularity by finding better quality communities by removing the resolution limit which is found in the modularity technique.

Although other techniques may not necessarily suffer from such a resolution limit, it is noted that other techniques are not scalable. Thus, the embodiments of the present invention have the advantage of being both scalable, and avoiding the resolution limit.

The advantages above can be explained further by understanding more about the definition of Modularity. Modularity is defined as:

$$\text{Modulaity} = \sum_{s=1}^{m} \left[\frac{a_s}{n} - \left(\frac{d_s}{2n}\right)^2\right],$$

where in relates to the number of partitions, $a_s$ relates to the number of intra community edges in a community s, where n relates to the number of edges in the network, and where $d_s$ relates to the total degree of the nodes in the community s.

The scoring functions according to embodiments of the invention are advantageous over known techniques, in that the scoring functions of the present invention take all three of the following parameters of a scoring function as input parameters:

Number of intra community edges,
Number of inter community edges,
Number of nodes in the community.

Other scoring functions (including modularity) suffer from limitations as none of them take into account all the above mentioned three parameters.

The following examples are provided to help illustrate further how the three parameters are necessary.

Figure 7D:
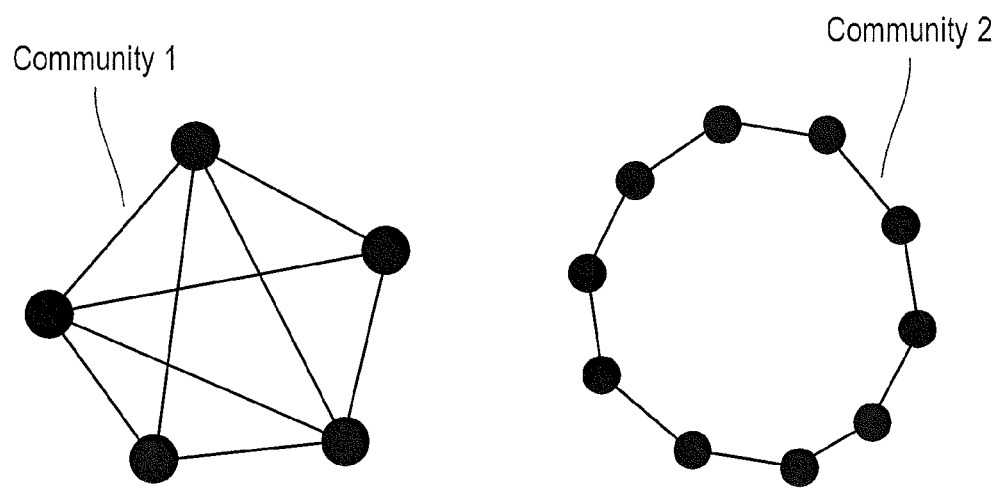

FIG. 7d shows a first scenario, in which first community (Community 1) and a second community (Community 2) differ only in the number of nodes. The number of intra community edges in both the communities is 10. The number of inter community edges in both communities is 0. The number of nodes in Community 1 is 5, while the number of nodes in Community 2 is 10. Modularity and Conductance (this being another popular scoring function) do not take care of the number of nodes and then both will give the same score to the above two communities, i.e. they are not able to distinguish between the above two communities. However, the scoring function according to embodiments of the present invention is able to distinguish between the two communities above.

Figure 7E:
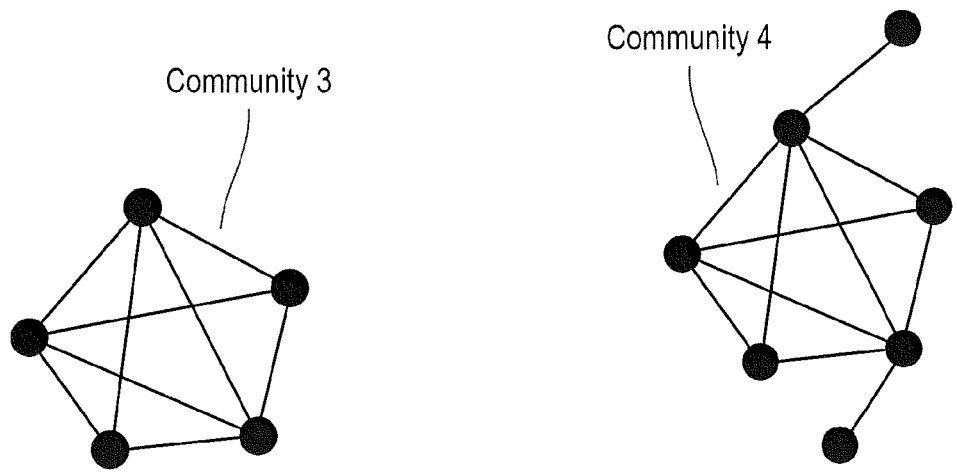

FIG. 7e shows a second scenario, in which one community (Community 3) and another community (Community 4) differ only in the number of inter community edges. The number of intra community edges in both the communities is 10. The number of inter community edges in Community 3 is 0, while the inter community edges in Community 4 is 2. The number of nodes in both communities is 5. Triangle participation ratio (TPR, being another popular scoring function) does not take care of the number of inter community edges, and it will give the same score to the above two communities, i.e. it is not able to distinguish between the above two communities. However, the scoring function according to embodiments of the present invention is able to distinguish between the two communities above.

Thus the scoring function according to embodiments of the present invention assign correct scores to communities by taking into consideration all the necessary parameters. This enables better quality communities to be determined which are resolution limit free when maximizing scoring functions according to the embodiments of the invention.

The embodiments of the present invention can be used in many applications or uses. For example, the embodiments of the invention can be used to find granular communities in Telecom Social Network. The embodiments described herein allow detection of communities that capture small interacting groups than courser communities. This can be used to find the influence circle of users, and for information broadcasting.

The embodiments of the invention can also be used to perform root cause analysis in device networks. For example, with weighted (based on information flow) networks in 2G, 3G, LTE devices, the embodiments can compute dependency radius, for example as described in co-pending patent application PCT/SE2013/051218. This can be used for proactive collective fault prediction and root cause analysis in case of failures.

Embodiments of the invention can also be used to find a commonly queried set of fields in information networks. With an information model built using the data-sources in operational support systems and business support systems (OSS/BSS), the fields can be connected to each other based on query patterns. For example, if two fields are queried together then they can be linked with each other. Based on the frequency, the links can also be weighed. Communities detected with this data can yield subsets of fields that are queried together and could be cached dynamically based on the query pattern of a user.

Another use for embodiments of the present invention is that of finding network affiliation. For example, when a user churns, his/her call patterns can be analyzed to find the new network affiliation of the user, for example as described in U.S. Pat. No. 8,385,906. Performance of this module can be improved by embodiments of the present invention, thus enabling the contact sub-group of a user to be detected more effectively. This is a sample use case, for which the proposed embodiments can be used. When a customer churns from an existing service of an operator, one application of the invention makes it possible to find the operator to which this customer would have most likely moved to. This is achieved based on the community affiliation discovered earlier. If a new number (MSISDN) "X" exhibits similar community affiliation characteristics, "X" can be mapped to the churned customer. From this the churned customer's new network affiliation can be predicted.

It is noted that the scoring function according to the embodiments of the invention can be used in other applications and uses, without departing from the scope of the appended claims.

Figure 8:
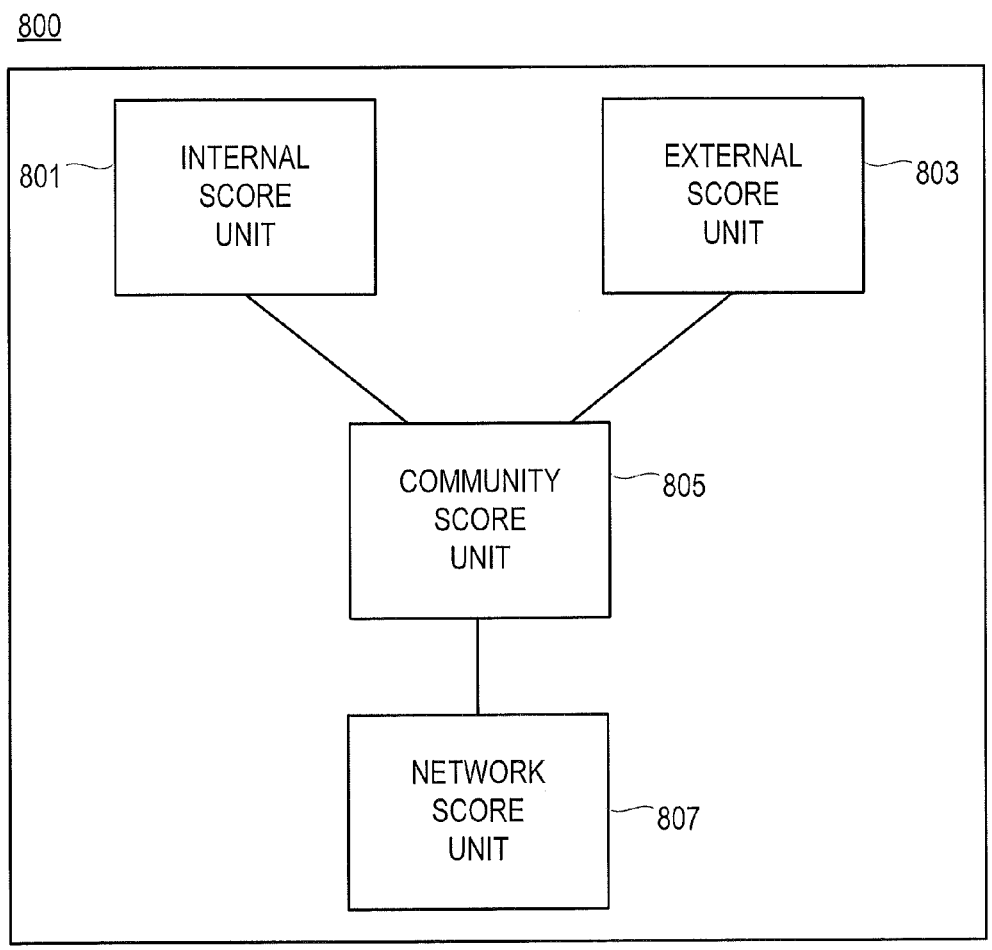
FIG. 8 shows a system according to another embodiment of the invention.

FIG. 8 shows a system 800 according to an embodiment of the present invention, for detecting communities in a network. The system 800 comprises an internal score unit 801 for defining an internal scoring function IS for a community, wherein the internal scoring function quantifies an internal quality of the community. The system 800 also comprises an external score unit 803 for defining an external scoring function ES for a community, wherein the external scoring function quantifies an external quality of the community. A community score unit 805 is provided for determining a community scoring function IE for a community, wherein the community scoring function comprises a product of the internal scoring function and the external scoring function. A network score unit 807 is provided for determining a network scoring function, wherein the network scoring function is based on the community scoring functions of communities in the network. The determined network scoring function is for use by a maximization algorithm for detecting a community in a network, for example for use by a greedy maximization algorithm.

According to another aspect of the present invention, there is provided a computer program product encoded in at least one non-transistory computer usable medium for use with a computer device. The computer program product comprises an internal score functional module for defining an internal scoring function IS for a community, wherein the internal scoring function quantifies an internal quality of the community, and an external score functional module for defining an external scoring function ES for a community, wherein the external scoring function quantifies an external quality of the community. The computer program product further comprises a community score functional module for determining a community scoring function IE for a community, wherein the community scoring function comprises a product of the internal scoring function and the external scoring function. The computer program product further comprises a network score functional module for determining a network scoring function, wherein the network scoring function is based on the community scoring functions of communities in the network, wherein the network scoring function is for use by a maximization algorithm for detecting a community in a network.

The embodiments of the invention have the advantage of being able to find finer and better communities with the new scoring function in a faster way when compared to the existing algorithms. This means that the embodiments of the present invention can be applied to large networks.

The embodiments of the present invention can be used for segmenting users, which can be used for promoting campaigns, schemes, and advertisements. They also allow better alpha users to be found, and better influence circles for users to be found. They also enable better peer influence for churn behavior to be found, for example for use with up-selling and so on.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for transmitting advertisements or service related messages to detected communities of one or more nodes in a network, the method comprising the steps of:
 defining, by a processor, an internal scoring function (IS) for a community of the one or more nodes, wherein the internal scoring function quantifies an internal quality of the community;
 defining, by the processor, an external scoring function (ES) for the community of the one or more nodes based on number of intra community edges in the community, wherein the external scoring function quantifies an external quality of the community;
 determining, by the processor, a community scoring function (IE) for the community of the one or more nodes, wherein the community scoring function comprises a product of the internal scoring function and the external scoring function;
 determining, by the processor, a network scoring function, wherein the network scoring function is based on the community scoring functions of communities in the network;
 using, by the processor, the network scoring function in a maximization algorithm for detecting a community in the network; and
 transmitting, by the processor, the advertisements or service related messages to the detected community.

2. A method as claimed in claim 1 wherein:
 the internal scoring function (IS) for the community is a function relating to how well connected all members of the community are with each other; and
 the external scoring function (ES) for the community is a function relating to how well separated the community is from the remainder of the network.

3. A method as claimed in claim 1 wherein:
 the internal scoring function (IS) for the community is defined as:

$$\text{Internal Scoring Function} = \frac{a_s}{\binom{n_s}{2}}$$

where s relates to the community, $a_s$ relates to the number of intra community edges in the community s, and where $n_s$ relates to number of nodes in the community s.

4. A method as claimed in claim 1 wherein:
 the external scoring function (ES) for the community is defined as:

$$\text{External Scoring Function} = \frac{a_s}{a_s + b_s}$$

where s relates to the community, $a_s$ relates to the number of intra community edges in the community s, and where $b_s$ relates to number of inter community edges in the community s.

5. A method as claimed in claim 1 wherein:
 the community scoring function (IE) for the community is defined as:

$$\text{Community Score} = \frac{a_s}{\binom{n_s}{2}} \frac{a_s}{a_s + b_s}$$

where s relates to the community, $a_s$ relates to the number of intra community edges in the community s, where $b_s$ relates to number of inter community edges in the community s, and where $n_s$ relates to number of nodes in the community s.

6. A method as claimed in claim 1, wherein the network scoring function comprises a weighted sum of scores of all the communities in the network.

7. A method as claimed in claim 6, wherein the weight corresponding to each community comprises number of nodes in that community, normalized by dividing the number of nodes in that community by total number of nodes in the network.

8. A method as claimed in claim 1, wherein the network scoring function is defined as:

$$\text{Network Scoring Function} = \sum_{s \in S} \frac{n_s}{n} \frac{a_s}{\binom{n_s}{2}} \frac{a_s}{a_s + b_s}$$

where s relates to the community, $a_s$ relates to the number of intra community edges in the community s, where $b_s$ relates to number of inter community edges in the community s, and where $n_s$ relates to number of nodes in the community.

9. A method as claimed in claim 1, wherein the maximization algorithm comprises a greedy maximization algorithm.

10. A method for transmitting advertisements or service related messages to detected communities of one and more nodes in the network, the method comprising the steps of performing a maximization algorithm using a scoring function as defined in claim 1, wherein a first phase of the maximization algorithm comprises the steps of:
 a) assigning each node of the network to its community;
 b) analysing each node of the network in a sequential manner;
 c) removing a node from its original community and adding the node either to the community of one of its neighbours or back to the original community, whichever will result in a greater increase in the scoring function; and d) repeating steps b) and c) until there is no increase in the network scoring function.

11. A method as claimed in claim 10, wherein a second phase of the maximization algorithm comprises the steps of:
   e) constructing an induced graph of the network using community labels of nodes obtained from the first phase;
   f) representing each community in the first phase by a node in the induced graph;
   g) using the induced graph obtained as the output of the second phase as input to the first phase; and
   h) iterating the first and second phases until there is no increase in the scoring function.

12. A method as claimed in claim 11, wherein the following community properties are preserved in the induced graph by associating them with a respective node:
   number of nodes in the community;
   sum of degree of all nodes in the community; and
   the number of intra community edges.

13. A method as claimed in claim 12, wherein weight of an edge between two nodes in the induced graph is equal to sum of weights of all edges between those two communities in the original graph.

14. A system for transmitting advertisements or service related messages to detected communities of one or more nodes in a network, the system comprising:
   a processor for defining an internal scoring function (IS) for a community of the one or more nodes, wherein the internal scoring function quantifies an internal quality of the community;
   the processor for defining an external scoring function (ES) for the community of the one or more nodes based on number of intra community edges in the community, wherein the external scoring function quantifies an external quality of the community;
   the processor for determining a community scoring function (IE) for the community of the one or more nodes, wherein the community scoring function comprises a product of the internal scoring function and the external scoring function;
   the processor for determining a network scoring function, wherein the network scoring function is based on the weighted community scoring functions of communities in the network,
   wherein the network scoring function is for use by a maximization algorithm for detecting a community in the network; and
   the processor for transmitting the advertisements or service related messages to the detected community.

15. A system as claimed in claim 14 wherein:
   the internal scoring function (IS) for the community is a function relating to how well connected all members of the community are with each other; and
   the external scoring function (ES) for the community is a function relating to how well separated the community is from the remainder of the network.

16. A system as claimed in claim 14 wherein:
   the internal scoring function (IS) for the community is defined as:

$$\text{Internal Scoring Function} = \frac{a_s}{\binom{n_s}{2}}$$

where s relates to the community, $a_s$ relates to the number of intra community edges in the community s, and where $n_s$ relates to number of nodes in the community s.

17. A system as claimed in claim 14 wherein:
the external scoring function (ES) for the community is defined as:

$$\text{External Scoring Function} = \frac{a_s}{a_s + b_s}$$

where s relates to the community, $a_s$ relates to the number of intra community edges in the community s, and where $b_s$ relates to number of inter community edges in the community s.

18. A system as claimed in claim 14 wherein:
the community scoring function (IE) for the community is defined as:

$$\text{Community Score} = \frac{a_s}{\binom{n_s}{2}} \frac{a_s}{a_s + b_s}$$

where s relates to the community, $a_s$ relates to the number of intra community edges in the community s, where $b_s$ relates to number of inter community edges in the community s, and where $n_s$ relates to number of nodes in the community s.

19. A system as claimed in claim 14, wherein the network scoring function is defined as:

$$\text{Network Scoring Function} = \sum_{s \in S} \frac{n_s}{n} \frac{a_s}{\binom{n_s}{2}} \frac{a_s}{a_s + b_s}$$

where s relates to the community, $a_s$ relates to the number of intra community edges in the community s, where $b_s$ relates to number of inter community edges in the community s, and where $n_s$ relates to number of nodes in the community.

20. A computer program product encoded in at least one non-transitory computer usable medium for use with a computer device, the computer program product comprising:
   a processor for defining an internal scoring function (IS) for a community of one or more nodes in a network, wherein the internal scoring function quantifies an internal quality of the community;
   the processor for defining an external scoring function (ES) for the community of the one or more nodes based on number of intra community edges in the community, wherein the external scoring function quantifies an external quality of the community;
   the processor for determining a community scoring function (IE) for the community of the one or more nodes, wherein the community scoring function comprises a product of the internal scoring function and the external scoring function;
   the processor for determining a network scoring function, wherein the network scoring function is based on the community scoring function of communities in the network, wherein the network scoring function is for use by a maximization algorithm for detecting a community in the network; and the processor for transmitting the advertisements and service related messages to the detected community.

* * * * *